(12) United States Patent
Ichikawa

(10) Patent No.: US 9,162,581 B2
(45) Date of Patent: Oct. 20, 2015

(54) VEHICLE, ELECTRIC DEVICE, AND POWER TRANSMISSION/RECEPTION SYSTEM

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 14/123,367

(22) PCT Filed: Jun. 3, 2011

(86) PCT No.: PCT/JP2011/062817
§ 371 (c)(1),
(2), (4) Date: Dec. 2, 2013

(87) PCT Pub. No.: WO2012/164743
PCT Pub. Date: Dec. 6, 2012

(65) Prior Publication Data
US 2014/0103872 A1    Apr. 17, 2014

(51) Int. Cl.
*H02J 7/00* (2006.01)
*B60L 11/18* (2006.01)
*B60L 1/00* (2006.01)
*H02J 7/02* (2006.01)

(52) U.S. Cl.
CPC .............. *B60L 11/182* (2013.01); *B60L 1/006* (2013.01); *H02J 7/025* (2013.01); *Y02T 10/7005* (2013.01); *Y02T 90/122* (2013.01); *Y02T 90/14* (2013.01); *Y02T 90/16* (2013.01)

(58) Field of Classification Search
CPC ........ H02J 7/025; H01F 38/14; Y02T 90/122; Y02T 90/14; Y02T 10/70; Y02T 10/7005; Y02T 10/7011; Y02T 10/7016; Y02T 10/7022; B60L 11/182; Y02E 60/12
USPC .......................................................... 320/108
See application file for complete search history.

(56) References Cited

U.S. PATENT DOCUMENTS

| | | | |
|---|---|---|---|
| 2005/0266904 A1* | 12/2005 | Kitaji et al. | 455/575.7 |
| 2010/0033135 A1* | 2/2010 | Nishida et al. | 320/136 |
| 2010/0289449 A1* | 11/2010 | Elo | 320/108 |
| 2011/0006612 A1 | 1/2011 | Kozakai | |
| 2011/0029792 A1 | 2/2011 | Nakano | |
| 2011/0080052 A1* | 4/2011 | Sato | 307/104 |
| 2011/0082612 A1 | 4/2011 | Ichikawa | |
| 2011/0121778 A1 | 5/2011 | Oyobe et al. | |
| 2012/0112555 A1 | 5/2012 | Toshimitsu et al. | |
| 2012/0319479 A1* | 12/2012 | Covic et al. | 307/31 |
| 2013/0009462 A1* | 1/2013 | Amano et al. | 307/9.1 |
| 2013/0026850 A1* | 1/2013 | Throngnumchai et al. | 307/104 |

FOREIGN PATENT DOCUMENTS

| | | |
|---|---|---|
| CN | 101835653 A | 9/2010 |
| EP | 2 716 489 A1 | 4/2014 |
| JP | A-2005-110412 | 4/2005 |
| JP | A-2007-104868 | 4/2007 |
| JP | A-2009-296780 | 12/2009 |
| JP | A-2010-268660 | 11/2010 |
| JP | A-2011-19291 | 1/2011 |
| JP | A-2011-034306 | 2/2011 |
| JP | A-2011-55669 | 3/2011 |
| JP | A-2011-083078 | 4/2011 |
| WO | WO 2010/052785 A1 | 5/2010 |
| WO | WO 2011/036702 A1 | 3/2011 |

OTHER PUBLICATIONS

Car and Driver Blog Retrieved from Internet: URL: https://web.archive.org/web/20110108131656/http://blog.caranddriver.com/gm-partners-with-powermat-to-offer-wireless-device-charging-in-chevy-volt-other-cars/ (Jan. 8, 2011) "GM Partners with Powermat to Offer Wireless Charging in Chevy Volt, Other Cars".

* cited by examiner

*Primary Examiner* — Arun Williams
(74) *Attorney, Agent, or Firm* — Oliff PLC

(57) ABSTRACT

A vehicle includes: a reception device receives power for running the vehicle in a non-contact manner using electromagnetic field resonance; and a transmission device transmits power supplied to a device inside the vehicle in a non-contact manner using the electromagnetic field resonance. An electromagnetic field frequency used by the reception device setting a different electromagnetic field frequency used to transmit power. To set the electromagnetic field frequency used by the reception device to receive power and the electromagnetic field frequency used by the transmission device to transmit power such that the electromagnetic field frequency used to receive power is lower than the electromagnetic field frequency used by the transmission device to transmit power. The power received by the reception device in a non-contact manner from an external transmission device outside the vehicle to be larger than the power transmitted by the transmission device in a non-contact manner.

8 Claims, 9 Drawing Sheets

VEHICLE, ELECTRIC DEVICE, AND POWER TRANSMISSION/RECEPTION SYSTEM

TECHNICAL FIELD

The present invention relates to a vehicle, an electric device, and a power transmission/reception system and in particular relates to a vehicle, an electric device, and a power transmission/reception system that transmit/receive power in a non-contact manner.

BACKGROUND ART

Vehicles such as an electric automobile and a plug-in hybrid automobile that can charge an in-vehicle power storage device from the outside have been in practical use. Techniques for charging automatically and for guiding to a parking position therefor have also been studied. Furthermore, there is a need for supplying power to an in-vehicle electric device inside the vehicle in order to charge a cellular phone battery and the like.

Japanese Patent Application Publication No. 2007-104868 (JP 2007-104868 A) (Patent Document 1) discloses a charger that charges a cellular phone battery inside the vehicle using electromagnetic induction.

PRIOR ART DOCUMENTS

Patent Documents

Patent Document 1: Japanese Patent Application Publication No. 2007-104868 (JP 2007-104868 A)
Patent Document 2: Japanese Patent Application Publication No. 2005-110412 (JP 2005-110412 A)
Patent Document 3: WO 2010/052785 Pamphlet

SUMMARY OF THE INVENTION

Problem to be Solved by the Invention

Because making a connection by a cable or wiring during charging or power supply is troublesome, there is a need for charging or supplying power to a battery of a vehicle and an in-vehicle electric device in a non-contact manner. In JP 2007-104868 A above, it is not described to charge the vehicle battery from the outside, and it is not specifically considered to charge both a cellular phone and the vehicle battery in a non-contact manner.

There is a case that efficient power transmission/reception cannot be achieved without consideration of characteristics of both a power transmission method for the in-vehicle electric device and a power reception method for charging the vehicle battery. For example, although non-contact power transmission/reception using electromagnetic field resonance has been considered in recent years, power supply to or charging of the in-vehicle electric device and the vehicle battery using the electromagnetic field resonance may affect the low-output in-vehicle electric device and thus break the device.

An object of the present invention is to provide a vehicle, an electric device, and a power transmission/reception system in which power for running the vehicle can be received from the outside in a non-contact manner and in which power supplied to the in-vehicle electric device can be transmitted in a non-contact manner.

Means for Solving the Problem

When summarized, the present invention is a vehicle that includes: a power reception device that receives power for running the vehicle in a non-contact manner using electromagnetic field resonance; and a power transmission device that transmits power supplied to an electric device inside the vehicle in a non-contact manner using the electromagnetic field resonance. A frequency of an electromagnetic field used by the power reception device to receive power is set to be different from a frequency of an electromagnetic field used by the power transmission device to transmit power.

It is desirable that the frequency of the electromagnetic field used by the power reception device to receive power and the frequency of the electromagnetic field used by the power transmission device to transmit power are set such that the frequency of the electromagnetic field used by the power reception device to receive power is lower than the frequency of the electromagnetic field used by the power transmission device to transmit power.

It is even more desirable for power received by the power reception device in a non-contact manner from an external power transmission device provided outside the vehicle to be larger than the power transmitted by the power transmission device to the electric device in a non-contact manner.

It is further desirable for the vehicle to include a driving device for driving the vehicle, a main battery for supplying power to the driving device, and an auxiliary battery separately provided from the main battery. A voltage of the auxiliary battery is lower than a voltage of the main battery, and the power transmission device receives power from the auxiliary battery to transmit the power to the electric device.

Moreover, it is desirable for the vehicle to include a control unit that sets an operation state of the vehicle to either a runnable state or a non-runnable state according to an operation by an occupant. The control unit permits charging of the main battery with power received by the power reception device and permits power supply from the power transmission device to the electric device in the runnable state, and permits charging of the main battery with power received by the power reception device and prohibits power supply from the power transmission device to the electric device in the non-runnable state.

In another aspect, the present invention is an electric device used inside a vehicle. The vehicle includes: a power reception device that receives power for running the vehicle in a non-contact manner from an external power transmission device using electromagnetic field resonance; and a power transmission device that transmits power supplied to the electric device in a non-contact manner using the electromagnetic field resonance. The electric device includes a power reception section that uses a frequency of an electromagnetic field that is different from a frequency of an electromagnetic field used by the power reception device of the vehicle to receive power in order to receive the power transmitted from the power transmission device.

It is desirable for the power reception section to use the frequency of the electromagnetic field that is higher than the frequency of the electromagnetic field used by the power reception device of the vehicle to receive power in order to receive power transmitted from the power transmission device.

In further another aspect, the present invention is a power transmission/reception system that includes: a vehicle; an external power transmission device that transmits power to the vehicle in a non-contact manner using electromagnetic field resonance; and an electric device that can be used inside the vehicle. The vehicle includes: a power reception device that receives power for running the vehicle from the external power transmission device in a non-contact manner using the electromagnetic field resonance; and a power transmission device that transmits power supplied to the electric device in a non-contact manner using the electromagnetic field resonance. A frequency of an electromagnetic field used by the power reception device to receive power is set to be different from a frequency of an electromagnetic field used by the power transmission device to transmit power.

Effect of the Invention

According to the present invention, it is possible to receive power for running the vehicle from the outside in a non-contact manner and to transmit power supplied to the in-vehicle electric device in a non-contacting manner without influencing each other.

MODES FOR CARRYING OUT THE INVENTION

Figure 1:
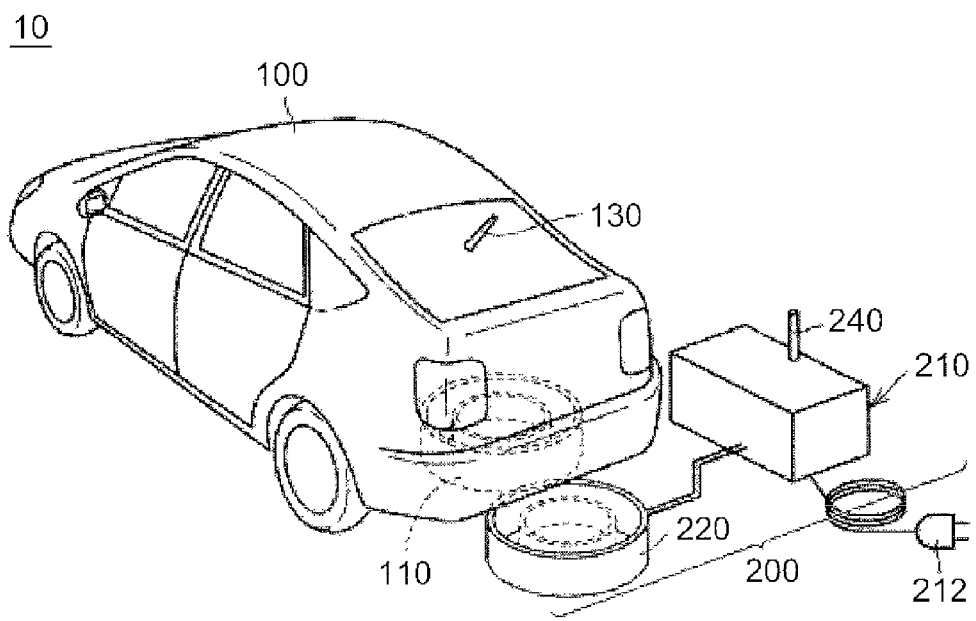
FIG. 1 shows an overall configuration of a power supply system for a vehicle according to an embodiment of the present invention.

A detailed description will hereinafter be made on an embodiment of the present invention with reference to the drawings. It should be noted that same or corresponding components in the drawings are denoted by the same reference numerals and descriptions thereof are not repeated.

FIG. 1 shows an overall configuration of a power supply system for a vehicle according to the embodiment of the present invention.

With reference to FIG. 1, the power transmission/reception system 10 includes a vehicle 100 and a power supply device 200. The vehicle 100 includes a power reception unit 110 and a communication unit 130.

The power reception unit 110 is provided on a bottom surface of a vehicle body to receive power that is transmitted from a power transmission unit 220 of the power supply device 200 in a non-contact manner. More specifically, the power reception unit 110 includes a self-resonance coil, which will be described below, and resonates with a self-resonance coil included in the power transmission unit 220 via an electromagnetic field to receive power from the power transmission unit 220 in a non-contact manner. The communication unit 130 is a communication interface for conducting communication between the vehicle 100 and the power supply device 200.

The power supply device 200 includes a high frequency power source device 210, the power transmission unit 220, and a communication unit 240. The high frequency power source device 210 converts, for example, commercial AC power that is supplied through a connector 212 to high frequency power and transmits the high frequency power to the power transmission unit 220. It should be noted that the frequency of the high frequency power that is generated by the high frequency power source device 210 is from 1 MHz to tens of MHz, for example.

The power transmission unit 220 is provided on a floor surface of a parking lot, for example, and transmits the high frequency power that is supplied from the high frequency power source device 210 to the power reception unit 110 of the vehicle 100 in a non-contact manner. More specifically, the power transmission unit 220 includes the self-resonance coil, and the self-resonance coil resonates with the self-resonance coil included in the power reception unit 110 via the electromagnetic field to transmit power to the power reception unit 110 in a non-contact manner. The communication unit 240 is a communication interface for conducting communication between the power supply device 200 and the vehicle 100.

Here, when power is supplied from the power supply device 200 to the vehicle 100, it is necessary to guide the vehicle 100 to the power supply device 200 in order to align the power reception unit 110 of the vehicle 100 and the power transmission unit 220 of the power supply device 200. In other words, unlike an in-vehicle electric device, which will be described below, it is difficult to align the vehicle 100. A user can easily lift the in-vehicle electric device by hand and place it in an appropriate position on a power supply unit of a battery or the like. On the other hand, the user has to operate and park the vehicle in a proper relative position, that is, the user cannot lift the vehicle to adjust the position thereof.

Accordingly, it is desirable to adopt a method with greater allowance in mismatch when power is supplied from the power supply device 200 to the vehicle 100. It is said that a transmission distance is short and allowance in mismatch is small in an electromagnetic induction method. If the electromagnetic induction method is adopted for power supply to the vehicle, there is a possibility that a high-precision driving skill is required for a driver, that a high-precision vehicle guiding device has to be installed in the vehicle, or that a movable section is required to move a position of a coil to handle an inaccurate parking position.

It is said that, in a resonance method using the electromagnetic field, relatively large power can be transmitted even when a transmission distance is a few meters and that the allowance in mismatch is generally greater than the electromagnetic induction method. Accordingly, power is supplied from the power supply device 200 to the vehicle 100 using the resonance method in the power transmission/reception system 10 of this embodiment.

Figure 2:
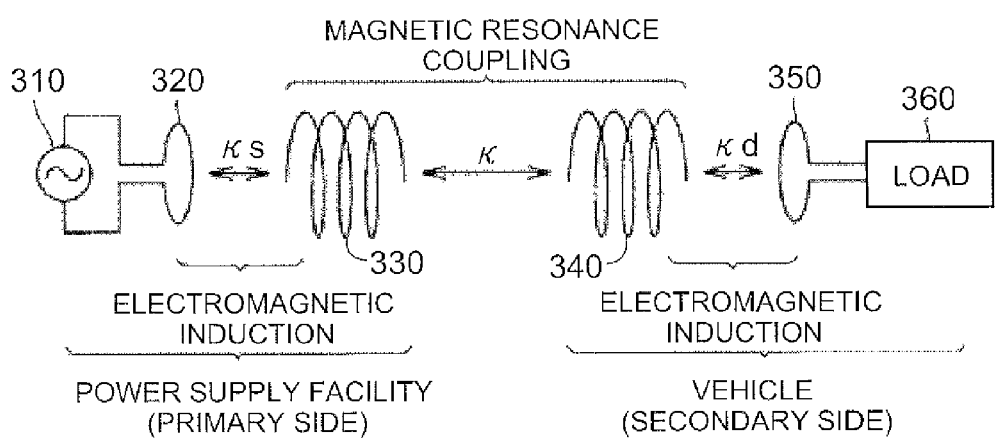
FIG. 2 is a view for illustrating principle of power transmission using a resonance method.

FIG. 2 is a view for illustrating principle of power transmission using the resonance method.

With reference to FIG. 2, in the resonance method, like two tuning forks resonating with each other, two LC resonance coils having a same natural frequency resonate with each other in the electromagnetic field (near field) to transmit power from the one coil to the other via the electromagnetic field.

More specifically, a primary coil 320 is connected to a high frequency power source 310 to supply high frequency power of 1 MHz to tens of MHz to a primary self-resonance coil 330 that is magnetically coupled to the primary coil 320 using the electromagnetic induction. The primary self-resonance coil 330 is an LC resonator using inductance and a stray capacitance of the coil itself and resonates with a secondary self-resonance coil 340 having a same resonance frequency as the primary self-resonance coil 330 via the electromagnetic field (near field). This causes energy (power) to move from the primary self-resonance coil 330 to the secondary self-resonance coil 340 via the electromagnetic field. The energy (power) that has moved to the secondary self-resonance coil 340 is taken by a secondary coil 350 that is magnetically coupled to the secondary self-resonance coil 340 using the electromagnetic induction, and is then supplied to a load 360. It should be noted that power transmission by the resonance method is realized when a Q value that indicates resonance strength between the primary self-resonance coil 330 and the secondary self-resonance coil 340 is greater than 100, for example.

As for corresponding relations with FIG. 1, the secondary self-resonance coil 340 and the secondary coil 350 correspond to the power reception unit 110 in FIG. 1, and the primary coil 320 and the primary self-resonance coil 330 correspond to the power transmission unit 220 in FIG. 1.

Figure 3:
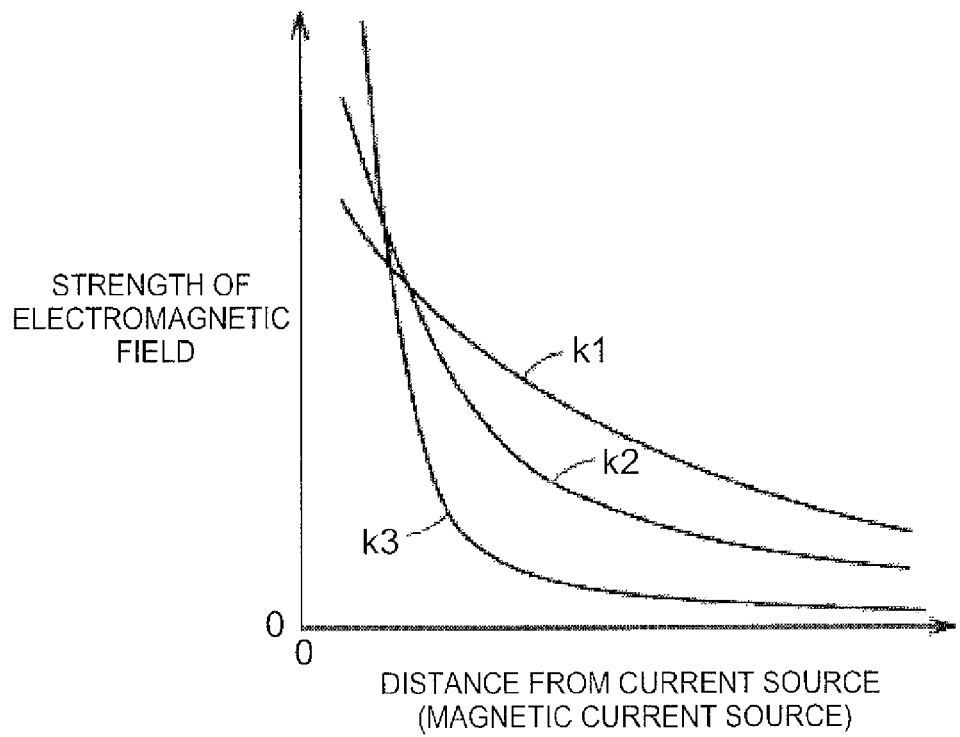
FIG. 3 is a graph for showing a relation between a distance from a current source (magnetic current source) and strength of an electromagnetic field.

FIG. 3 is a graph for showing a relation between a distance from a current source (magnetic current source) and strength of an electromagnetic field.

With reference to FIG. 3, the electromagnetic field includes three components. A curve k1 is a component that is inversely proportional to a distance from a wave source, and is referred to as a "radiation electromagnetic field". A curve k2 is a component that is inversely proportional to the squares of the distance from the wave source, and is referred to as an "induction electromagnetic field". A curve k3 is a component that is inversely proportional to the cubes of the distance from the wave source, and is referred to as a "static electromagnetic field".

Although there is a region in the graph where the strength of the electromagnetic wave is rapidly decreased along with the distance from the wave source, the energy (power) is transmitted by using the near field (evanescent field) in the resonance method. In other words, a pair of resonators having the same natural frequency (such as a pair of the LC resonance coils) is resonated using the near field to transmit the energy (power) from the one resonator (primary self-resonance coil) to the other resonator (secondary self-resonance coil). Because the energy (power) is not propagated to a distance in the near field, it is possible with the resonance method to transmit power with less energy loss than the electromagnetic wave that transmits the energy (power) using the "radiation electromagnetic field" for propagating the, energy to the distance.

Figure 4:
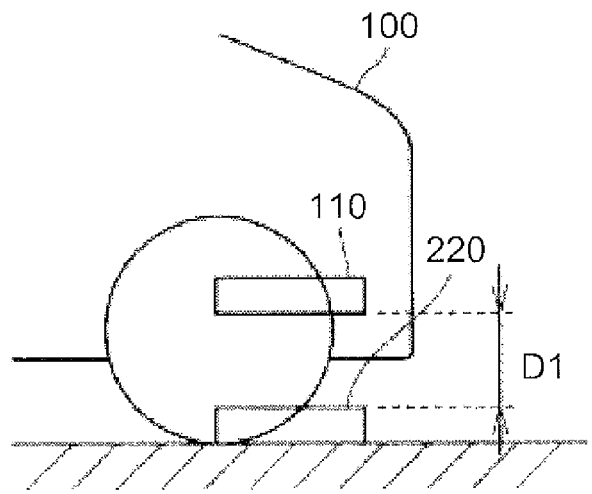
FIG. 4 is a view for illustrating a distance between a power reception unit 110 and a power transmission unit 220.

FIG. 4 is a view for illustrating a distance between the power reception unit 110 and the power transmission unit 220.

With reference to FIG. 4, a distance D1 between the power reception unit 110 and the power transmission unit 220 is longer than a transmission distance in the electromagnetic induction method. The distance D1 allows power transmission by the resonance method. It should be noted that the distance D1 can be changed by changing a shape or size of the self-resonance coil of the power transmission unit 220 and the power reception unit 110.

Figure 5:
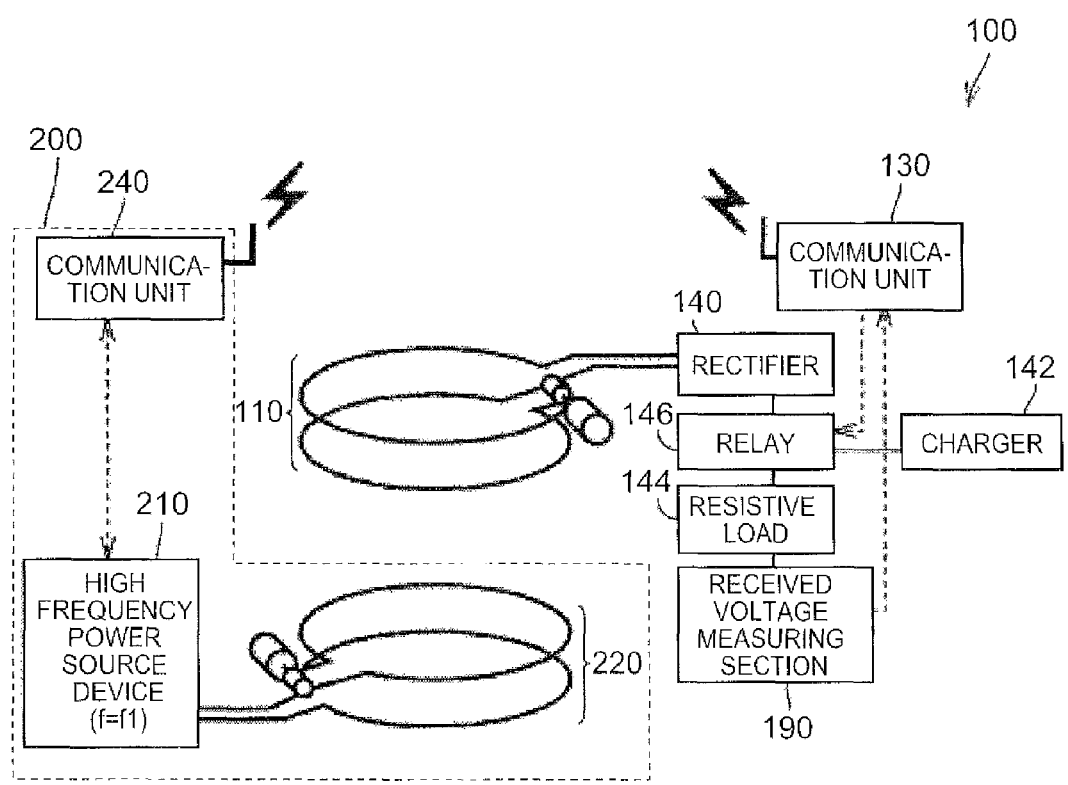
FIG. 5 shows a schematic configuration associated with power transmission/reception between a vehicle and a power supply device that are illustrated in this embodiment.

FIG. 5 shows a schematic configuration of power transmission/reception between the vehicle and the power supply device that are illustrated in this embodiment.

With reference to FIG. 5, the power supply device 200 includes the power transmission unit 220, the high frequency power source device 210, and the communication unit 240. The vehicle 100 includes the communication unit 130, the power reception unit 110, a rectifier 140, a relay 146, a resistor 144, a power reception voltage measuring section (voltage sensor 190), and a charger (DC/DC converter 142) for charging a power storage device, which is not shown.

The communication unit 240 and the communication unit 130 wirelessly communicate with each other to exchange information for alignment of the power reception unit 110 and the power transmission unit 220. The resistor 144 is temporarily connected to the output of the power transmission unit by the relay 146, thereby obtaining voltage information on whether or not the output of the voltage sensor 190 satisfies a power reception condition. A request for transmitting low power to obtain the voltage information is sent from the vehicle 100 to the power supply device 200 via the communication units 130, 240.

Figure 6:
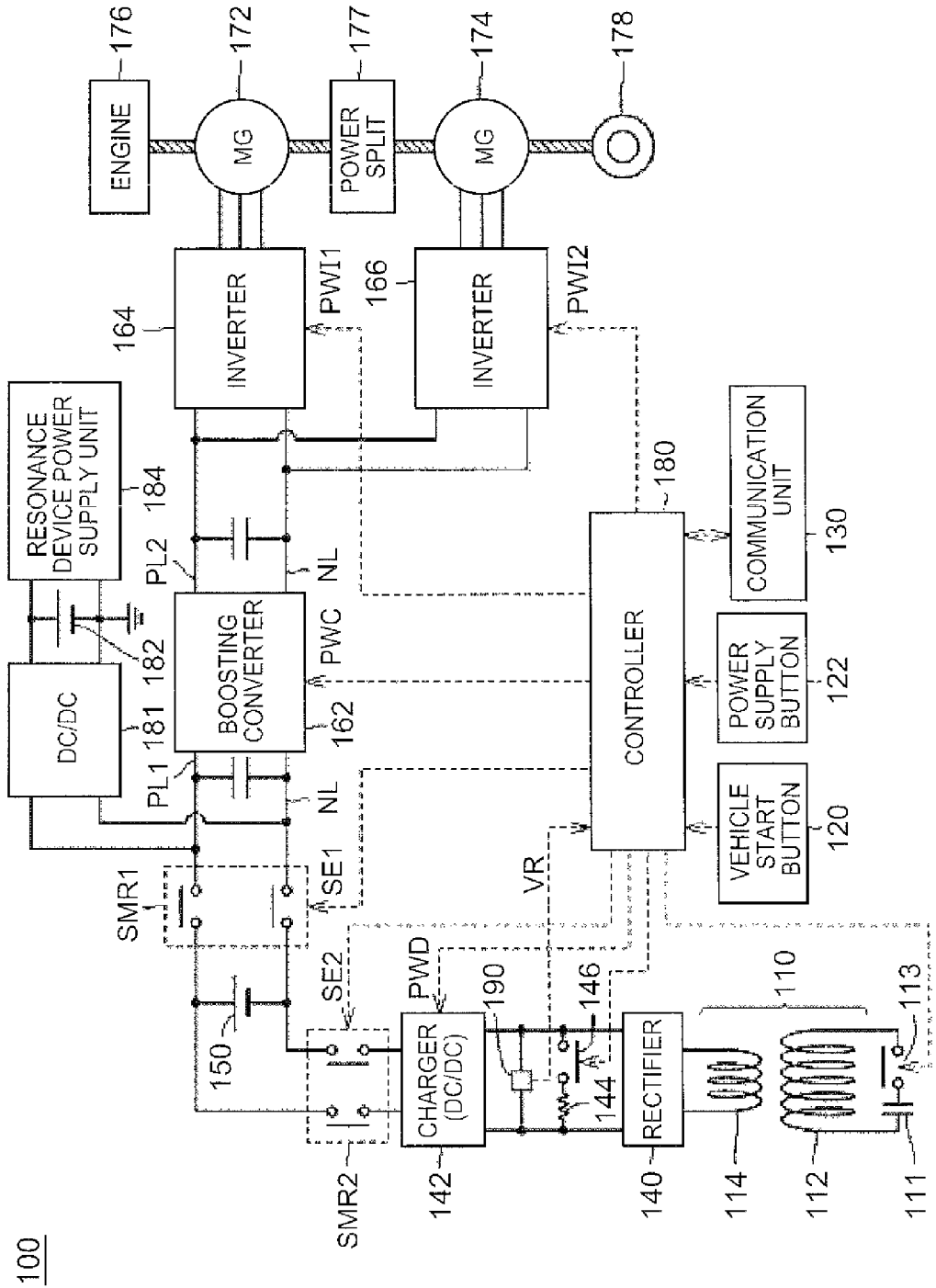
FIG. 6 shows a detailed configuration of a vehicle 100 shown in FIG. 1 and FIG. 5.

FIG. 6 shows the detailed configuration of the vehicle 100 that is shown in FIG. 1 and FIG. 5.

With reference to FIG. 6, the vehicle 100 includes a main battery 150, a system main relay SMR1, a boosting converter 162, inverters 164, 166, motor generators 172, 174, an engine 176, a motive power split device 177, and a drive wheel 178.

The vehicle 100 further includes a secondary self-resonance coil 112, a secondary coil 114, the rectifier 140, the DC/DC converter 142, a system main relay SMR2, and the voltage sensor 190.

Moreover, the vehicle 100 includes the controller 180, a vehicle start button 120, the communication unit 130, and a power supply button 122.

The engine 176 and the motor generator 174 are installed as motive power sources in the vehicle 100. The engine 176 and the motor generators 172, 174 are connected to the motive power split device 177. The vehicle 100 runs by a driving force that is generated by at least one of the engine 176 and the motor generator 174. The motive power generated by the engine 176 is split into two paths by the motive power split device 177. More specifically, one is a path for transmitting the power to the drive wheel 178, and the other is a path for transmitting the power to the motor generator 172.

The motor generator 172 is an AC rotary electric machine and includes a three-phase AC synchronous motor in which a permanent magnet is embedded in a rotor, for example. The motor generator 172 generates power using kinetic energy of the engine 176 that is split by the motive power split device 177. For example, when a charging state (also referred to as SOC (state of charge)) of the main battery 150 becomes lower than a predetermined value, the engine 176 starts, the motor generator 172 generates power so as to charge the main battery 150.

The motor generator 174 is also an AC rotary electric machine and, like the motor generator 172, includes a three-phase AC synchronous motor in which a permanent magnet is embedded in a rotor, for example. The motor generator 174 uses at least either one of the power stored in the main battery 150 and the power generated by the motor generator 172 to generate the driving force. The driving force generated by the motor generator 174 is transmitted to the drive wheel 178.

During breaking of the vehicle or when acceleration on a downhill is reduced, mechanical energy that is stored in the vehicle as kinetic energy or potential energy is used to rotationally drive the motor generator 174 via the drive wheel 178, and the motor generator 174 is operated as a generator. Accordingly, the motor generator 174 is operated as a regenerative brake that converts travel energy to power, and generates a braking force. The power generated by the motor generator 174 is stored in the main battery 150.

The motive power split device 177 can use a planetary gear that includes a sun gear, a pinion gear, a carrier, and a ring gear. The pinion gear meshes with the sun gear and the ring gear. The carrier supports the pinion gear in a rotatable manner and is connected to a crankshaft of the engine 176. The sun gear is connected to a rotary shaft of the motor generator 172. The ring gear is connected to a rotary shaft of the motor generator 174 and the drive wheel 178.

The main battery 150 is a rechargeable DC power source and includes a secondary battery such as a lithium ion battery or a nickel hydrogen battery, for example. The main battery 150 stores not only the power supplied from the DC/DC converter 142 but also the power generated by the motor generators 172, 174. The main battery 150 supplies the stored power to the boosting converter 162. It should be noted that a large-capacity capacitor can be adopted as the main battery 150. Any of the main battery 150 can be adopted as long as it is a power buffer that temporarily stores the power supplied from the power supply device 200 (FIG. 1) and the regenerative power from the motor generators 172, 174 and that can supply the stored power to the boosting converter 162.

The system main relay SMR1 is disposed between the main battery 150 and the boosting converter 162. The system main relay SMR1 electrically connects the main battery 150 to the boosting converter 162 once a signal SE1 from the controller 180 is activated, and blocks an electric path between the main battery 150 and the boosting converter 162 once the signal SE1 is deactivated. Based on a signal PWC from the controller 180, the boosting converter 162 boosts a voltage on a positive-electrode line PL2 to a voltage that is equal to or higher than a voltage that is output from the main battery 150. It should be noted that the boosting converter 162 includes a DC chopper circuit, for example.

The inverters 164, 166 are provided to respectively correspond with the motor generators 172, 174. The inverter 164 drives the motor generator 172 based on a signal PWI1 from the controller 180, and the inverter 166 drives the motor generator 174 based on a signal PWI2 from the controller 180. It should be noted that the inverters 164, 166 include a three-phase bridge circuit, for example.

The secondary self-resonance coil 112 is connected at both ends to a capacitor 111 via a switch (relay 113) and resonates with a primary resonance coil of the power supply device 200 via the electromagnetic field when the switch (relay 113) is brought into a conductive state. Accordingly, power is received from the power supply device 200 shown in FIG. 1 and FIG. 5 by the resonance. Although FIG. 6 shows an example that is provided with the capacitor 111, the secondary self-resonance coil may be adjusted with the primary self-resonance coil so that the stray capacitance of the coil is used instead of the capacitor for the resonance.

As for the secondary self-resonance coil 112, the number of turns thereof is appropriately set such that a distance from the primary self-resonance coil of the power supply device 200 and the Q value for representing the resonance strength between the primary self-resonance coil and the secondary self-resonance coil 112 are increased (Q>100, for example) and that κ for representing a degree of coupling is reduced.

The secondary coil 114 is coaxially disposed with the secondary self-resonance coil 112 and can be magnetically coupled to the secondary self-resonance coil 112 by the electromagnetic induction. The secondary coil 114 takes out the power received from the secondary self-resonance coil 112 using the electromagnetic induction and outputs it to the rectifier 140. It should be noted that the secondary self-resonance coil 112 and the secondary coil 114 form the power reception unit 110 that is shown in FIG. 1.

The rectifier 140 rectifies the AC power taken out by the secondary coil 114. Based on a signal PWD from the controller 180, the DC/DC converter 142 converts the power that is rectified by the rectifier 140 to a voltage level of the main battery 150 and outputs it to the main battery 150.

The system main relay SMR2 is disposed between the DC/DC converter 142 and the main battery 150. The system main relay SMR2 electrically connects the main battery 150 to the DC/DC converter 142 once a signal SE2 from the controller 180 is activated, and blocks an electric path between the main battery 150 and the DC/DC converter 142 once the signal SE2 is deactivated. The voltage sensor 190 detects a voltage VR between the rectifier 140 and the DC/DC converter 142 and outputs a detected value to the controller 180.

The resistor 144 and the relay 146 that are connected in series are provided between the rectifier 140 and the DC/DC converter 142. The relay 146 is controlled into a conductive state by the controller 180 when the position of the vehicle is adjusted in a case where the vehicle 100 is supplied with power in a non-contact manner.

The controller 180 generates the signals PWC, PWI1, PWI2 for respectively driving the boosting converter 162 and the motor generators 172, 174 based on an accelerator operation amount, a vehicle speed, and other signals from various sensors. The controller 180 respectively outputs the generated signals PWC, PWI1, PWI2 to the boosting converter 162 and the inverters 164, 166. During running of the vehicle, the controller 180 activates the signal SE1 to turn on the system main relay SMR1 and deactivates the signal SE2 to turn off the system main relay SMR2.

A power reception state can be determined on the basis of the voltage VR by sending low power. Accordingly, a driver or a vehicle guiding system aligns the vehicle based on the voltage VR:

Once the alignment of the vehicle is completed, the controller 180 sends a power supply command to the power supply device 200 via the communication unit 130 and activates the signal SE2 to turn on the system main relay SMR2. Then, the controller 180 generates the signal PWD for driving the DC/DC converter 142 and outputs the generated signal PWD to the DC/DC converter 142.

The vehicle 100 further includes an auxiliary battery 182, a DC/DC converter 181 that is provided between power lines PL1, NL and the auxiliary battery 182 and that lowers the voltage of the main battery 150 to supply it to an auxiliary load and the auxiliary battery 182, and the resonance device power supply unit 184.

The resonance device power supply unit 184 is one of the auxiliary loads and supplies power to the in-vehicle electric device in a non-contact manner. In this embodiment, the resonance method is adopted as a non-contact power supply method by the resonance device power supply unit 184. As a representative example, the in-vehicle electric device is a cellular phone, and the device power supply unit is a unit for charging a battery of the cellular phone; however, the battery is not necessarily installed in the in-vehicle electric device, and any in-vehicle electric device can be adopted as long as power can be supplied thereto in a non-contact manner. As other examples of the in-vehicle electric device, a personal computer, a music player, a digital camera, a video camera, a game machine, and a wireless communication device can be raised. Although not limited, they tend to be portable and small in size.

It is desirable for the power that is received by the power reception unit 110 in a non-contact manner from an external power transmission device provided outside the vehicle to be larger than the power that is transmitted by the resonance device power supply unit 184 in a non-contact manner to the in-vehicle electric device. In addition, a capacity of the main battery 150 in the vehicle is far larger than a capacity of the battery that is installed in the in-vehicle electric device such as the cellular phone.

By adopting the resonance method for charging the main battery 150 of the vehicle and also by adopting the resonance method, which uses the electromagnetic wave with the different frequency from that for charging the main battery 150, for supplying power to the in-vehicle electric device, it is possible to eliminate the influence of two types of non-contact power transmission/reception to each other. In case of the resonance method, the main battery 150 of the vehicle can be charged without influencing the in-vehicle electric device by selecting the resonance frequency of a resonance section that is different from the resonance frequency of the general in-vehicle electric device. The resonance frequency of the resonance section (the secondary self-resonance coil 112 of the power reception unit 110) is determined by an LC component that is defined by inductance L of the power reception unit related to a coil diameter and a capacity C of the capacitor connected to the coil. Because of the portable in-vehicle electric device is smaller than the vehicle in size, the inductance L that is too large to be installed in the general in-vehicle electric device may be installed in the vehicle.

Figure 7:
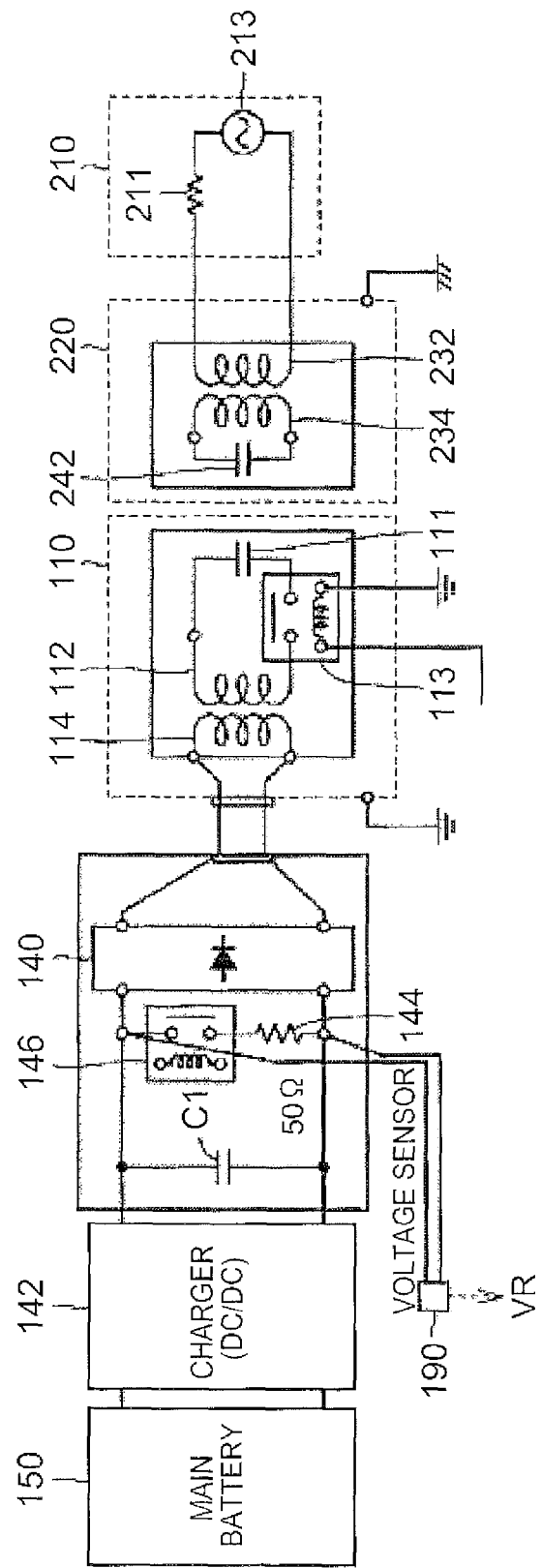
FIG. 7 is a circuit diagram for illustrating the power reception unit 110 on the vehicle side and the power transmission unit 220 on the power supply device side in more detail.

FIG. 7 is a circuit diagram for illustrating the power reception unit 110 on the vehicle side and the power transmission unit 220 on the power supply device side in more detail.

With reference to FIG. 7, the high frequency power source device 210 is represented by a high frequency AC power source 213 and a resistor 211 that indicates the impedance of the power source.

The power transmission unit 220 includes a primary coil 232 that is connected to the high frequency power source device 210, a primary self-resonance coil 234 that is magnetically coupled to the primary coil 232 by the electromagnetic induction, and a capacitor 242 that is connected to both ends of the primary self-resonance coil 234.

The power reception unit 110 includes the secondary self-resonance coil 112 that resonates with the primary self-resonance coil 234 via the electromagnetic field and the capacitor 111 and a relay 113 that are connected in series to both ends of the secondary self-resonance coil 112. The relay 113 is controlled into a conductive state when power is received.

The power reception unit 110 further includes the secondary coil 114 that is magnetically coupled to the secondary self-resonance coil 112. The AC power received by the secondary coil 114 is rectified by the rectifier 140. A capacitor C1 is connected to the output of the rectifier 140, and the relay 146 and the resistor 144 that are used when adjusting the positions of the vehicle and a power supply facility are connected between electrodes of the capacitor C1. The charger (DC/DC converter 142) is further connected to the output side of the rectifier 140 to convert the voltage to an appropriate charging voltage, and the charging voltage after conversion is transmitted to the battery (main battery 150).

The impedance of the resistor 144 is set to 50Ω, for example, and this value is adjusted to match the impedance of the resistor 211 in the high frequency power source device 210.

The voltage sensor 190 detects the voltage at the both ends of the resistor 144 when a stop position of the vehicle is adjusted in the case where power is supplied to the vehicle in a non-contact manner, and outputs the detected value VR to the controller 180.

Meanwhile, when the adjustment of the vehicle position is completed, and power is supplied to the vehicle from the external power source in a non-contact manner for charging, the voltage sensor 190 detects a voltage that is input to the DC/DC converter 142 as the detected value VR.

Figure 8:
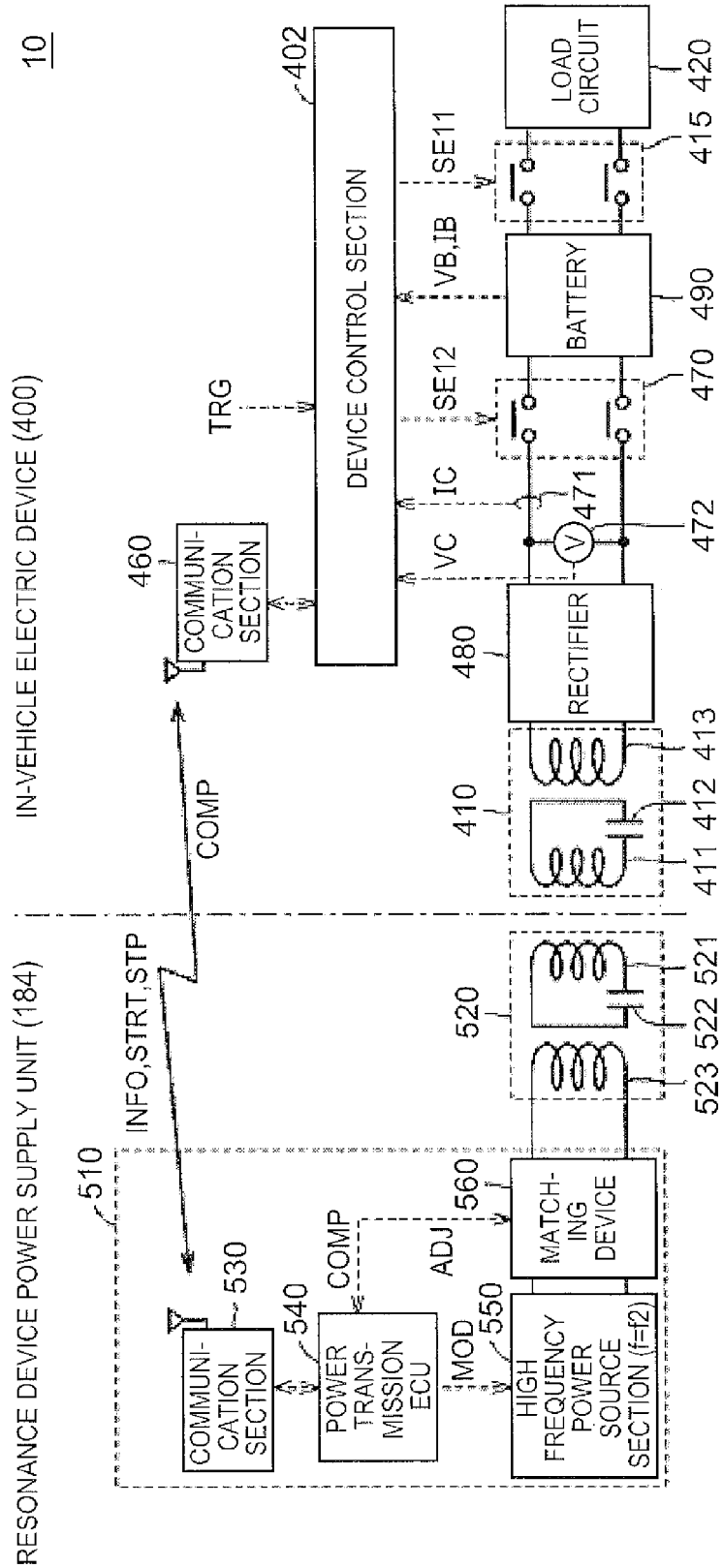
FIG. 8 is a circuit diagram for showing configurations of a resonance device power supply unit 184 and a power reception section of the in-vehicle electric device in FIG. 6.

FIG. 8 is a circuit diagram for showing configurations of the resonance device power supply unit 184 and the power reception section of the in-vehicle electric device in FIG. 6.

With reference to FIG. 8, the power transmission/reception system of the vehicle is configured to include the resonance device power supply unit 184 that is included in the vehicle in which the electric device is charged and a power reception section 410 that is installed in an in-vehicle electric device 400 to which power is supplied by the resonance device power supply unit 184.

The in-vehicle electric device 400 is, for example, a cellular phone, a personal computer, a digital camera, a PDA, a portable music player, or another portable electric device.

The in-vehicle electric device 400 includes the power reception section 410, a communication section 460, a rectifier 480, a charging connection circuit 470, a battery 490, a power source switch 415, a load circuit 420, a device control section 402, a current sensor 471, and a voltage sensor 472. The power reception section 410 includes a secondary resonance coil 411, a capacitor 412, and a secondary coil 413.

The secondary resonance coil 411 receives power from a primary resonance coil 521 that is included in the resonance device power supply unit 184 by the electromagnetic resonance using the electromagnetic field.

As for the secondary resonance coil 411, the number of turns thereof is appropriately set such that the Q value for representing the resonance strength between the primary resonance coil 521 and the secondary resonance coil 411 is increased (Q>100, for example) and that κ for representing a degree of coupling is reduced on the basis of a distance from the primary resonance coil 521 of the resonance device power supply unit 184, the resonance frequency of the primary resonance coil 521 and the secondary resonance coil 411, and the like.

The capacitor 412 is connected to both ends of the secondary resonance coil 411 and, together with the secondary resonance coil 411, forms an LC resonance circuit. A capacity of the capacitor 412 is appropriately set to have the predetermined resonance frequency according to the inductance of the secondary resonance coil 411. It should be noted that the capacitor 412 may not be provided when the desired resonance frequency can be obtained by the stray capacitance of the secondary resonance coil 411 itself.

The secondary coil 413 is coaxially provided with the secondary resonance coil 411 and can be magnetically coupled to the secondary resonance coil 411 by the electromagnetic induction. The secondary coil 413 takes out the power received by the secondary resonance coil 411 using the electromagnetic induction and outputs it to the rectifier 480.

The rectifier 480 rectifies the AC power received from the secondary coil 413 and outputs the rectified DC power to the battery 490 via the charging connection circuit 470. The rectifier 480 may include a diode bridge and a smoothing capacitor (neither is shown), for example. A so-called switching regulator that rectifies using switching control can be used as the rectifier 480; however, because there is a case that the rectifier 480 is included in the power reception section 410, it is preferred to adopt a static rectifier such as the diode bridge in order to prevent malfunction of a switching element associated with the generated electromagnetic field, or the like.

In this embodiment, the DC power that is rectified by the rectifier 480 is directly output to the battery 490; however, if a rectified DC voltage is different from a charging voltage that is accepted by the battery 490, a DC/DC converter for converting the voltage (not shown) may be provided between the rectifier 480 and the battery 490.

The voltage sensor 472 is provided between a pair of power lines that connects between the rectifier 480 and the battery 490. The voltage sensor 472 detects the DC voltage on the secondary side of the rectifier 480, that is, the received voltage from the resonance device power supply unit 184, and outputs a detected value VC to the device control section 402.

The current sensor 471 is provided on a power line that connects between the rectifier 480 and the battery 490. The current sensor 471 detects charging current to the battery 490 and outputs a detected value IC to the device control section 402.

The charging connection circuit 470 is electrically connected to the rectifier 480 and the battery 490. The charging connection circuit 470 is controlled by a control signal SE12 from the device control section 402 to switch between supply and block of power from the rectifier 480 to the battery 490.

The battery 490 is a power storage element in capable of charging and discharging. The battery 490 includes a secondary battery such as a lithium ion battery, a nickel hydrogen battery, or a lead acid battery and a power storage element such as an electric double-layered capacitor, for example.

The battery 490 is connected to the rectifier 480 via the charging connection circuit 470. The battery 490 stores the power that is received by the power reception section 410 and rectified by the rectifier 480. The battery 490 is also connected to the load circuit 420 via the power source switch 415. The battery 490 supplies the power for generating the vehicle driving force to the load circuit 420. The output of the battery 490 is about 3.6 V, for example.

Although not shown, the battery 490 is provided with a voltage sensor and a current sensor for respectively detecting a voltage VB of the battery 490 and current IB that is input/output thereto. These detected values are output to the device control section 402. The device control section 402 calculates or estimates a charging state (also referred to as "SOC (state of charge)") of the battery 490 based on the voltage VB and the current IB.

The power source switch 415 is provided on a power line that connects between the battery 490 and the load circuit 420. The power source switch 415 is controlled by a control signal SE11 from the device control section 402 and switches between supply and block of power between the battery 490 and the load circuit 420.

The communication section 460 is a communication interface for conducting wireless communication between the in-vehicle electric device 400 and the resonance device power supply unit 184. The communication section 460 outputs battery information INFO from the device control section 402 that includes the SOC of the battery 490 to the resonance device power supply unit 184. In addition, the communication section 460 outputs signals STRT, STP that instruct start and stop of power transmission from the resonance device power supply unit 184 to the resonance device power supply unit 184.

Although not shown in FIG. 1, the device control section 402 includes a central process unit (CPU), a memory, and an input/output buffer, inputs a signal from each sensor and the like, and outputs a control signal to each device while controlling the in-vehicle electric device 400 and each device. It should be noted that such control is not limited to processing by software but can be processed by a dedicated hardware (electronic circuit).

When receiving a charging start signal TRG upon completion of the user operation, the alignment, or the like, the device control section 402 outputs the signal STRT for instructing the start of power transmission to the resonance device power supply unit 184 via the communication section 460 on the basis that a predetermined condition is met. In addition, on the basis that the battery 490 is fully charged or upon the user operation, the device control section 402 outputs the signal STP for instructing the stop of power transmission to the resonance device power supply unit 184 via the communication section 460.

The resonance device power supply unit 184 includes a power source device 510 and a power transmission section 520. The power source device 510 includes a communication section 530, a power transmission ECU 540 as a controller, a high frequency power source section 550, and a matching device 560. The power transmission section 520 includes the primary resonance coil 521, a capacitor 522, and a primary coil 523.

The high frequency power source section 550 is controlled by a control signal MOD from the power transmission ECU 540 and converts the power received from the auxiliary battery 182 or the DC/DC converter 181 of FIG. 6 to the high frequency power (frequency f=f2).

Then, the high frequency power source section 550 supplies the converted high frequency power to the primary coil 523 via the matching device 560. It should be noted that the frequency f2 of the high frequency power generated by the high frequency power source section 550 is 1 MHz to tens of MHz, for example. The frequencies f1, f2 are set such that the frequency f2 is different from the frequency f1 of the high frequency power source device of FIG. 5. Although the frequency f2 can be set lower than the frequency f1, it is preferred that the frequency f2 be set higher than the frequency f1 of the high frequency power source device of FIG. 5.

The matching device 560 is a circuit for matching the impedance of the resonance device power supply unit 184 and that of the in-vehicle electric device 400. The matching device 560 is configured to include a variable capacitor and a variable inductor. The matching device 560 is controlled by a control signal ADJ from the power transmission ECU 540 that is based on the battery information INFO sent from the in-vehicle electric device 400, and then the variable capacitor and the variable inductor are adjusted such that the impedance of the resonance device power supply unit 184 matches the impedance on the in-vehicle electric device 400 side. In addition, the matching device 560 outputs a signal COMP that indicates completion of impedance adjustment to the power transmission ECU 540.

The primary resonance coil 521 transmits power to the secondary resonance coil 411 that is included in the power reception section 410 of the in-vehicle electric device 400 using the electromagnetic resonance.

As for the primary resonance coil 521, the number of turns thereof is appropriately set such that the Q value for representing the resonance strength between the primary resonance coil 521 and the secondary resonance coil 411 is increased (Q>100, for example) and that κ for representing a degree of coupling is reduced on the basis of a distance from the secondary resonance coil 411 of the in-vehicle electric device 400, the resonance frequency of the primary resonance coil 521 and the secondary resonance coil 411, and the like.

The capacitor 522 is connected to both ends of the primary resonance coil 521 and forms an LC resonance circuit together with the primary resonance coil 521. A capacity of the capacitor 522 is appropriately set to have the predetermined resonance frequency according to the inductance of the primary resonance coil 521. It should be noted that the capacitor 522 may not be provided when the desired resonance frequency can be obtained by the stray capacitance of the primary resonance coil 521 itself.

The primary coil 523 is coaxially provided with the primary resonance coil 521 and can be magnetically coupled to the primary resonance coil 521 by the electromagnetic induction. The primary coil 523 transmits the high frequency power supplied via the matching device 560 to the primary resonance coil 521 using the electromagnetic induction.

As described above, the communication section 530 is a communication interface for conducting wireless communication between the resonance device power supply unit 184 and the in-vehicle electric device 400. The communication section 530 receives the battery information INFO sent from the communication section 460 on the in-vehicle electric device 400 side and the signals STRT, STP for respectively instructing the start and stop of power transmission, and outputs such information to the power transmission ECU 540. In addition, the communication section 530 receives from the power transmission ECU 540 the signal COMP for indicating the completion of the impedance adjustment from the matching device 560, and outputs it to the in-vehicle electric device 400 side.

Although not shown in FIG. 8, the power transmission ECU 540 includes a CPU, a memory, and an input/output buffer, inputs a signal from each sensor and the like, and outputs a control signal to each device while controlling each device in the power source device 510. It should be noted that such control is not limited to processing by software but can be processed by a dedicated hardware (electronic circuit).

In this embodiment, an example is shown in which the battery 490 is installed as the in-vehicle electric device 400; however, the battery 490 is not necessarily required in the in-vehicle electric device 400. The battery 490 may not be installed in the in-vehicle electric device 400 as long as power is supplied to the in-vehicle electric device 400 in a non-contact manner.

Figure 9:
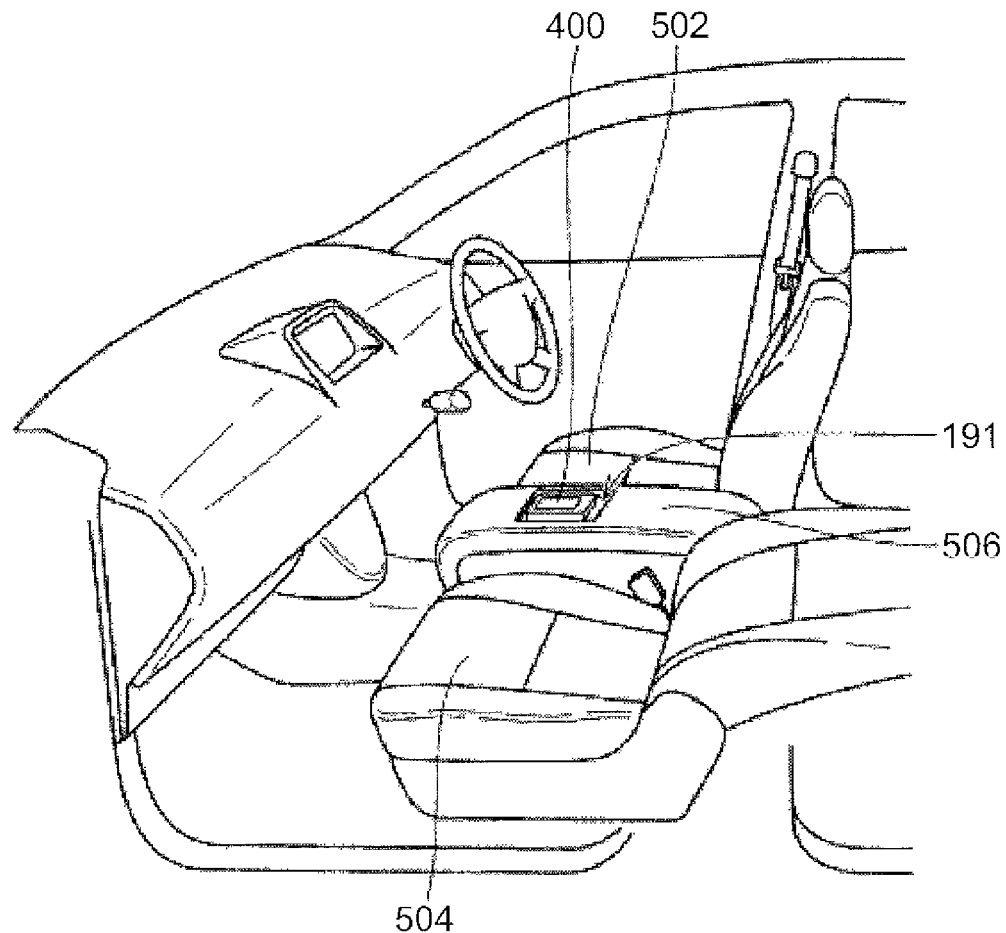
FIG. 9 is a view for illustrating an arrangement example of the resonance device power supply unit 184 of FIG. 8 in the vehicle.

FIG. 9 is a view for illustrating an arrangement example of the resonance device power supply unit 184 of FIG. 8 in the vehicle.

With reference to FIG. 9, it is preferred to arrange the resonance device power supply unit 184 in a position inside a cabin that is accessible from both a driver seat 502 and a passenger seat 504. It is desirable to provide the resonance device power supply unit 184 on a tray of a center console 506, a pocket of a dashboard, or the like.

With such an arrangement that is far from the power reception unit 110 shown in FIG. 1, there is less possibility for the power supply to the in-vehicle electric device and the power reception by the power reception unit 110 to influence each other. Although his is merely illustrative and is not restrictive in any way, FIG. 9 shows an example in which the resonance device power supply unit 184 is provided in the center console 506 and a bottom surface of the tray serves as a device arrangement surface 191 on which the in-vehicle electric device 400 is placed.

Figure 10:
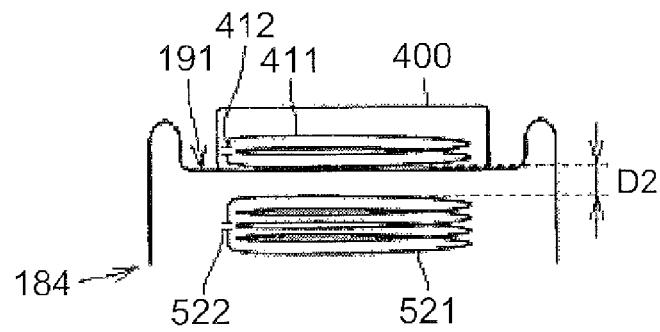
FIG. 10 is a view for illustrating a distance between a coil of the in-vehicle electric device and a coil of a device power supply unit.

FIG. 10 is a view for illustrating a distance between a coil of the in-vehicle electric device and a coil of the device power supply unit.

With reference to FIG. 10, housings of the in-vehicle electric device 400 and the resonance device power supply unit 184 are set such that a distance between a power reception side coil 404 that is installed in or attached to the in-vehicle electric device 400 and a power supply side coil 194 of the resonance device power supply unit 184 is a distance D2. FIG. 10 shows an example in which the distance D2 is shorter than the distance D1 that is shown in FIG. 4. However, unlike the electromagnetic induction method, it is possible with the resonance method to achieve practical efficiency even when a distance for non-contact power transmission is 3 to 4 m. Accordingly, when the power that is transmitted from the resonance device power supply unit 184 to the in-vehicle electric device 400 is sufficiently low, the user can hold the in-vehicle electric device 400 by hand for charging without placing it in a designated position as shown in FIG. 9 and FIG. 10.

It is desirable to make the accurate alignment for the greater power transmission efficiency. Although the in-vehicle electric device 400 does not contact the resonance device power supply unit 184 electrically, the device arrangement surface 191 is provided in the resonance device power supply unit 184 so that the housings physically contact each other. Each of the housings is provided with a projection and/or a recess for alignment, a magnet, or the like, and thus the in-vehicle electric device 400 can easily be brought into a state without mismatch when the user lifts it by hand and places it on the device arrangement surface 191 of the resonance device power supply unit 184 before manually adjusting the position. This significantly differs from the alignment between the power reception unit 110 and the power transmission unit 220 in FIG. 1.

As it has been described so far, when the power reception by the in-vehicle battery and the power supply to the in-vehicle electric device are performed in a non-contact manner, the resonance methods using the different resonance frequencies from each other are employed. Accordingly, it is possible to prevent the low-output in-vehicle device from resonating with the resonance frequency for the power reception by the in-vehicle battery and thus to prevent the in-vehicle device from receiving power. In addition, while power is received by the in-vehicle battery, power can also be supplied to the in-vehicle electric device inside the vehicle in a non-contact manner.

Generally speaking, when the resonance frequency is decreased to the low frequency, and especially when large power is handled, it is possible to reduce cost of a unit such as a resonance coil. On the other hand, when low power is handled, the resonance frequency can easily be increased to the high frequency. Therefore, it is possible to reduce the overall cost of the vehicle by setting the resonance frequency of the power reception unit for the in-vehicle high-power battery to be lower than the resonance frequency of the power supply unit for the in-vehicle low-power electric device.

Figure 11:
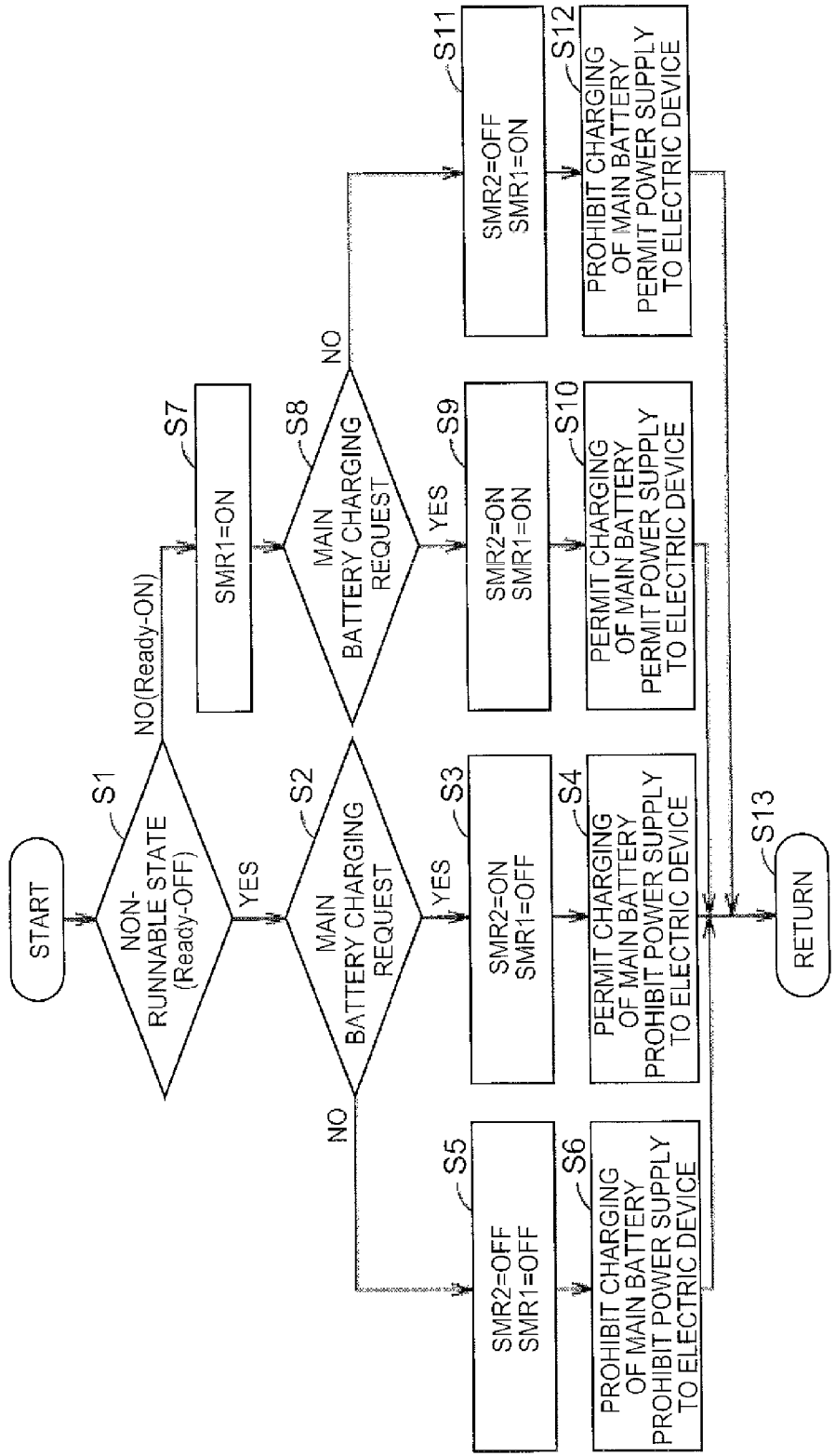
FIG. 11 is a flowchart for illustrating control that is associated with permission for power transmission/reception and is executed by a controller 180 of FIG. 6.

FIG. 11 is a flowchart for illustrating control that is associated with permission for power transmission/reception and is executed by the controller 180 of FIG. 6. A process in this flowchart is invoked and executed every time a certain time period has elapsed since a main routine of the vehicle control or every time predetermined conditions are satisfied.

With reference to FIG. 6 and FIG. 11, once the process is started, the controller 180 determines in a step S1 whether or not the vehicle is in a vehicle non-runnable state.

For example, when the vehicle is in the vehicle non-runnable state (Ready-OFF state), the vehicle is brought into a runnable state (Ready-ON state) by pushing the vehicle start button 120 once, and the vehicle can be started by setting a shift range to a drive range and depressing an accelerator pedal.

When the vehicle is in the runnable state (Ready-ON state), the vehicle is brought into the vehicle non-runnable state (Ready-OFF state) by pushing the vehicle start button 120 again, and thus the vehicle cannot be started even with the accelerator pedal being depressed.

In the runnable state, the system main relay SMR1 of FIG. 6 is conducted, the motor generators 172, 174 can thus be energized, and the engine 176 can be operated.

On the other hand, in the non-runnable state, the system main relay SMR1 of FIG. 6 is not conducted, the motor generators 172, 174 cannot be energized, and the engine 176 cannot be operated.

If the vehicle is in the non-runnable state (Ready-OFF) in the step S1, the process proceeds to a step S2, and if the vehicle is in the runnable state (Ready-ON), the process proceeds to a step S7.

In the step S2, the controller 180 determines whether or not there is a charging request for the main battery 150. The charging request for the main battery 150 may be provided from an input device operated by the driver (such as the power supply button 122 of FIG. 6), for example, or may be generated by the controller 180 itself on the basis of a signal that indicates the completion of the alignment between the power transmission unit 220 and the power reception unit 110 of FIG. 1 or the charging state SOC (state of charge) of the main battery 150.

In the step S2, if there is the charging request for the main battery 150, the process proceeds from the step S2 to a step S3, and if there is no charging request, the process proceeds from the step S2 to a step S5.

In the step S3, while the system main relay SMR2 is turned ON, the system main relay SMR1 is controlled to be OFF. Then, in a step S4, while the charging of the main battery 150 is permitted, the power supply to the in-vehicle electric device is prohibited. In this state, a circumstance where the driver is away from the vehicle during the charging of the main battery 150 can be assumed.

In the step S5, both of the system main relays SMR1 and SMR2 are controlled to be OFF. Then, in a step S6, neither the charging of the main battery 150 nor the power supply to the in-vehicle electric device is permitted.

If the vehicle is in the runnable state (Ready-ON) in the step S1, and the process proceeds to the step S7, the system main relay SMR1 is controlled to be ON, and the vehicle is brought into a state that the motor generators 172, 174 can be energized. In this state, because it is assumed that the driver remains inside the vehicle, auxiliary devices such as an air-conditioner, audio equipment, and the like (not shown) can be used. Then, it is determined in a step S8 whether or not there is the charging request for the main battery 150.

If there is the charging request for the main battery 150 in the step S8, the process proceeds to a step S9, and if there is no charging request, the process proceeds to a step S11.

In the step S9, both of the system main relays SMR1 and SMR2 are controlled to be ON. Then, in a step S10, both of the charging of the main battery 150 and the power supply to the in-vehicle electric device are permitted.

In the step S11, while the system main relay SMR2 remains OFF, the system main relay SMR1 is controlled to be ON. Then, in a step S12, while the charging of the main battery 150 is prohibited, the power supply to the in-vehicle electric device is permitted.

Once the process in either one of the steps S4, S6, S10, and S12 is completed, the control returns to the main routine in the step S13.

Figure 12:
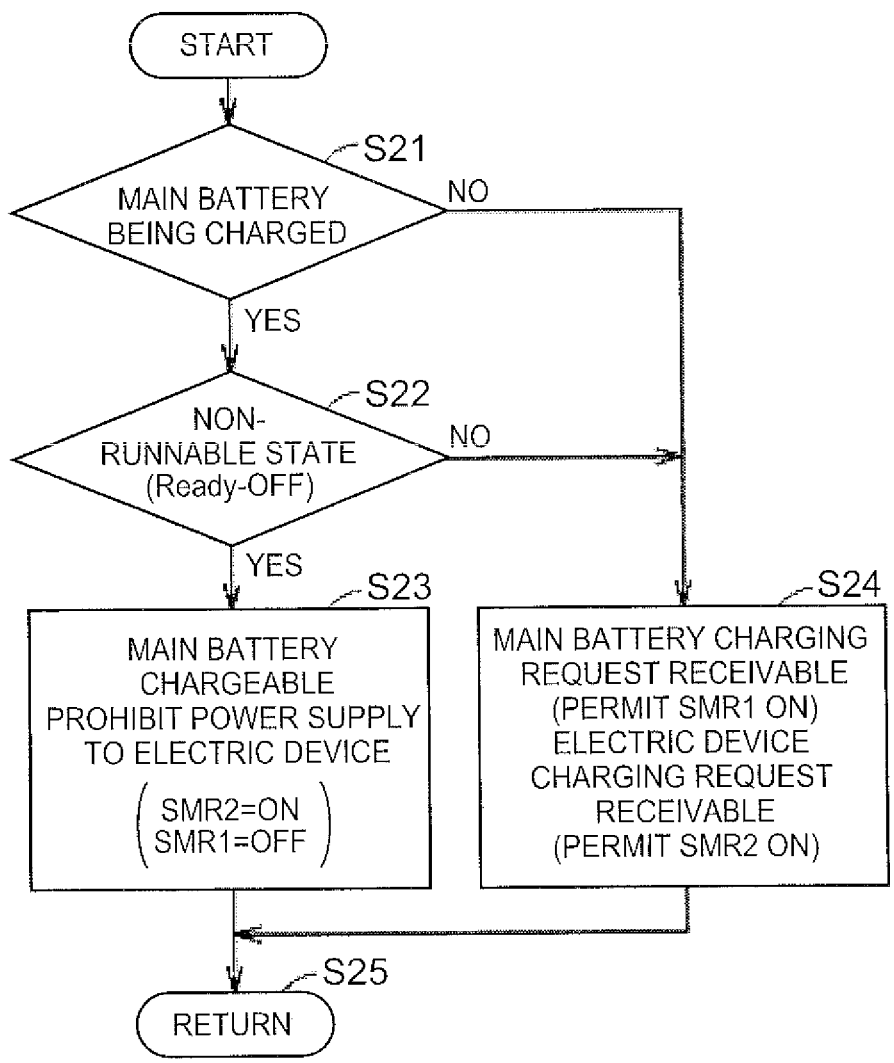
FIG. 12 is a flowchart for illustrating control in a modified example that is associated with the permission for power transmission/reception and is executed by the controller 180 of FIG. 6.

FIG. 12 is a flowchart for illustrating control in a modified example that is associated with the permission for power transmission/reception and is executed by the controller 180 of FIG. 6. A process in this flowchart is invoked and executed every time a certain time period has elapsed since the main routine of the vehicle control or every time predetermined conditions are satisfied.

With reference to FIG. 6 and FIG. 12, once the process is started, the controller 180 determines in a step S21 whether or not the main battery 150 is being charged. In the step S21, if the main battery 150 is not being charged, the process proceeds to a step S24, and if the main battery 150 is being charged, the process proceeds to a step S22.

It is determined in the step S22 whether or not a current vehicle state is the non-runnable state (Ready-OFF state). If the vehicle state is the non-runnable state in the step S22, the process proceeds to a step S23, and if not the non-runnable state, that is, if the runnable state (Ready-ON state), the process proceeds to the step S24.

In the step S23, the controller 180 controls the system main relays SMR1, SMR2, the DC/DC converter 142, and the resonance device power supply unit 184 such that the main battery 150 can be charged and that the power supply to the in-vehicle electric device is prohibited.

On the other hand, in the step S24, the controller 180 controls the system main relays SMR1, SMR2, the DC/DC converter 142, and the resonance device power supply unit 184 such that the charging request for the main battery 150 can be received and that a request of the power supply to the in-vehicle electric device can be received.

Generally speaking, when the driver moves away from the vehicle during the charging of the main battery 150, the driver sets the vehicle to the non-runnable state before leaving. In such a case, it is possible by prohibiting power supply to the in-vehicle electric device to avoid a circumstance where power is supplied to the in-vehicle electric device, thereby causing an unexpected event in the absence of an occupant such as the driver.

It can also be considered that the driver or the like stays inside the vehicle during the charging of the main battery 150 and operates the air-conditioner or audio equipment. When such a circumstance where an occupant is in the cabin is assumed, the power supply to the in-vehicle electric device in a non-contact manner can also be permitted to enhance the convenience.

Lastly, this embodiment will be summarized with reference to the drawings again. With reference to FIG. 6, the vehicle 100 includes: the power reception unit 110 that receives power for running the vehicle 100 in a non-contact manner using the electromagnetic field resonance; and the resonance device power supply unit 184 that transmits power supplied to the electric device inside the vehicle in a non-contact manner using the electromagnetic field resonance. The frequency of the electromagnetic field used by the power reception unit 110 to receive power is set to be different from the frequency of the electromagnetic field used by the resonance device power supply unit 184 to transmit power.

It is desirable to set the frequency (f1 of FIG. 5) of the electromagnetic field used by the power reception unit 110 to receive power and the frequency (f2 of FIG. 8) of the electromagnetic field used by the resonance device power supply unit 184 to transmit power such that the frequency (f1 of FIG. 5) of the electromagnetic field used by the power reception unit 110 to receive power is lower than the frequency (f2 of FIG. 8) of the electromagnetic field used by the resonance device power supply unit 184 to transmit power.

It is even more desirable for the power that is received by the power reception unit 110 in a non-contact manner from the power supply device 200 provided outside the vehicle to be larger than the power that is transmitted by the resonance device power supply unit 184 to the in-vehicle electric device 400 in a non-contact manner.

It is further desirable for the vehicle 100 to include the motor generators 172, 174 for driving the vehicle 100, the main battery 150 for supplying the power to the motor generators 172, 174, and the auxiliary battery 182 separately provided from the main battery 150. The voltage of the auxiliary battery 182 is lower than the voltage of the main battery 150, and the resonance device power supply unit 184 receives power from the auxiliary battery 182 to transmit power to the in-vehicle electric device 400.

Moreover, it is desirable for the vehicle to include the controller 180 that sets the vehicle operation state to either the runnable state (Ready-ON state) or the non-runnable state (Ready-OFF state) according to the operation of the start button 120 or the like by the occupant. As shown in FIG. 12, in the runnable state (NO in the step S22), the controller 180 permits the charging of the main battery 150 with the power that is received by the power reception unit 110, and also permits the power supply from the resonance device power supply unit 184 to the in-vehicle electric device 400. Meanwhile, in the non-runnable state (YES in the step S22), the controller 180 permits the charging of the main battery 150 with the power that is received by the power reception unit 110, and prohibits the power supply from the resonance device power supply unit 184 to the in-vehicle electric device 400.

In another aspect, the present invention is the in-vehicle electric device 400 that is used inside the vehicle. The vehicle 100 includes: the power reception unit 110 that receives power for running the vehicle 100 from the power supply device 200 in a non-contact manner using the electromagnetic field resonance; and the resonance device power supply unit 184 that transmits power supplied to the in-vehicle electric device 400 in a non-contact manner using the electromagnetic field resonance. The in-vehicle electric device 400 includes the power reception section 410 that uses the frequency of the electromagnetic field that is higher than the frequency of the electromagnetic field used by the power reception unit 110 of the vehicle 100 to receive power in order to receive the power transmitted from the resonance device power supply unit 184.

In further another aspect, the present invention is the power transmission/reception system, and includes the vehicle 100, the power supply device 200 that transmits power to the vehicle 100 in a non-contact manner using the electromagnetic field resonance, and the in-vehicle electric device 400 that can be used inside the vehicle. The vehicle 100 includes: the power reception unit 110 that receives power for running the vehicle from the external power supply device 200 in a non-contact manner using the electromagnetic field resonance; and the resonance device power supply unit 184 that transmits power supplied to the in-vehicle electric device 400 in a non-contact manner using the electromagnetic field resonance. The frequency of the electromagnetic field used by the power reception unit 110 to receive power is set to be different from the frequency of the electromagnetic field used by the resonance device power supply unit 184 to transmit power.

In this embodiment, FIG. 6, FIG. 7, and the like show the example that includes the secondary self-resonance coil 112 and the secondary coil 114; however, the invention of the subject application is not limited to such a configuration and can be adopted for a configuration in which power is not transmitted between the secondary self-resonance coil 112 and the secondary coil 114 by the electromagnetic induction. In other words, it can be adopted as long as the resonance method is used for power reception by the vehicle, and can also be adopted for a configuration in which there is no coil to receive power by the electromagnetic induction.

In this embodiment, FIG. 6, FIG. 7, FIG. 8, and the like show the example that includes the primary self-resonance coil, the primary coil, the secondary self-resonance coil, and the secondary coil; however, the invention of the subject application is not limited to such a configuration, and can be adopted for a configuration in which power transmission between the secondary self-resonance coil 112 and the secondary coil 114 and power transmission between the primary coil 232 and the primary self-resonance coil 234 are not conducted by the electromagnetic induction as well as for a configuration in which power transmission between the secondary self-resonance coil 411 and the secondary coil 413 and power transmission between the primary coil 523 and the primary self-resonance coil 521 are not conducted by the electromagnetic induction. In other words, it can be adopted as long as the resonance method is employed to transmit/receive power to the vehicle and to transmit/receive power to the in-vehicle electric device, and can also be adopted for a configuration in which there is no coil to transmit/receive power by the electromagnetic induction on a path for power transmission/reception by the resonance method.

The embodiment of the disclosure should be considered in all respects as illustrative and not restrictive. The scope of the present invention is not defined by the above description but defined by the appended claims, and all changes which come within the meaning and range of equivalency of the claims are to be embraced within their scope.

DESCRIPTION OF REFERENCE NUMERALS AND SYMBOLS

10: power transmission/reception system; 100: vehicle; 110: power reception unit; 111, 242, 412, 522, C1: capacitor; 112, 340: secondary self-resonance coil; 113,146: relay; 114, 350, 413: secondary coil; 120: vehicle start button; 122: power supply button; 130, 240: communication unit; 140, 480: rectifier; 142, 181: DC/DC converter; 144, 211: resistor; 150: main battery; 162: boosting converter; 164, 166: inverter; 172, 174: motor generator; 176: engine; 177: motive power split device; 178: drive wheel; 180: controller; 182: auxiliary battery; 184: resonance device power supply unit; 190, 472: voltage sensor; 191: device arrangement surface; 194: power supply side coil; 200: power supply device; 210: high frequency power source device; 212: connector; 213: high frequency AC power source; 220: power transmission unit; 232, 320, 523: primary coil; 234, 330: primary self-resonance coil; 310: high frequency power source; 360: load; 400: in-vehicle electric device; 402: device control section; 404: power reception side coil; 410 power reception section; 411 secondary resonance coil; 415: power source switch; 420: load circuit; 460, 530: communication section; 470: charging connection circuit; 471: current sensor; 490: battery; 502: driver seat; 504: passenger seat; 506: center console; 510: power source device; 520: power transmission section; 521: primary resonance coil; 550: high frequency power source section; 560: matching device; PL1, NL power line; PL2: positive electrode line; SMR1, SMR2: system main relay.

The invention claimed is:

1. A vehicle comprising:
a power reception device configured to receive power for running the vehicle in a non-contact manner using electromagnetic field resonance; and
a power transmission device configured to transmit power supplied to an electric device inside the vehicle in a non-contact manner using the electromagnetic field resonance,
wherein a frequency of an electromagnetic field used by the power reception device to receive power is set to be different from a frequency of an electromagnetic field used by the power transmission device to transmit power.

2. The vehicle according to claim 1, wherein the frequency of the electromagnetic field used by the power reception device to receive power and the frequency of the electromagnetic field used by the power transmission device to transmit power are set such that the frequency of the electromagnetic field used by the power reception device to receive power is lower than the frequency of the electromagnetic field used by the power transmission device to transmit power.

3. The vehicle according to claim 2, wherein power received by the power reception device in a non-contact manner from an external power transmission device provided outside the vehicle is larger than power transmitted by the power transmission device to the electric device in a non-contact manner.

4. The vehicle according to claim 3 further comprising:
driving devices configured to drive the vehicle;
a main battery configured to supply power to the driving devices; and
an auxiliary battery separately provided from the main battery,
wherein a voltage of the auxiliary battery is lower than a voltage of the main battery, and
the power transmission device is configured to receive power from the auxiliary battery to transmit power to the electric device.

5. The vehicle according to claim 4 further comprising:
a controller configured to set an operational state of the vehicle to a runnable state or a non-runnable state according to an operation by an occupant,
the controller being configured to permit charging of the main battery with power received by the power reception device and being configured to permit power supply from the power transmission device to the electric device in the runnable state, and the controller being configured to permit charging of the main battery with power received by the power reception device and being configured to prohibit power supply from the power transmission device to the electric device in the non-runnable state.

6. An electric device used inside a vehicle, including:
a power reception device configured to receive power for running the vehicle in a non-contact manner from an external power transmission device using electromagnetic field resonance; and
a power transmission device configured to transmit power supplied to the electric device in a non-contact manner using the electromagnetic field resonance,
the electric device comprising:
a power reception section configured to receive power transmitted from the power transmission device by using a frequency of an electromagnetic field that is different from a frequency of an electromagnetic field used by the power reception device of the vehicle to receive power.

7. The electric device according to claim 6, wherein the power reception section is configured to receive power transmitted from the power transmission device by using the frequency of the electromagnetic field that is higher than the frequency of the electromagnetic field used by the power reception section of the vehicle to receive power.

8. A power transmission/reception system comprising:
a vehicle;
an external power transmission device configured to transmit power to the vehicle in a non-contact manner using electromagnetic field resonance; and
an electric device able to be used inside the vehicle, wherein
the vehicle includes:
a power reception device configured to receive power for running the vehicle in a non-contact manner from the external power transmission device using the electromagnetic field resonance; and
a power transmission device configured to transmit power supplied to the electric device in a non-contact manner using the electromagnetic field resonance, and
a frequency of an electromagnetic field used by the power reception device to receive power is set to be different from a frequency of an electromagnetic field used by the power transmission device to transmit power.

* * * * *